(12) United States Patent
Nakashima et al.

(10) Patent No.: US 6,589,162 B2
(45) Date of Patent: Jul. 8, 2003

(54) ENDOSCOPE SYSTEM AND VIDEO CAMERA FOR ENDOSCOPE

(75) Inventors: Masaaki Nakashima, Tokyo (JP); Naoki Kikuchi, Tokyo (JP)

(73) Assignee: Pentax Corporation, Tokyo (JP)

( * ) Notice: Subject to any disclaimer, the term of this patent is extended or adjusted under 35 U.S.C. 154(b) by 200 days.

(21) Appl. No.: 09/785,163

(22) Filed: Feb. 20, 2001

(65) Prior Publication Data

US 2001/0015754 A1 Aug. 23, 2001

(30) Foreign Application Priority Data

| Feb. 21, 2000 | (JP) | ................................... | 2000-042517 |
| Feb. 22, 2000 | (JP) | ................................... | 2000-043768 |
| Apr. 14, 2000 | (JP) | ................................... | 2000-113712 |

(51) Int. Cl.[7] .............................................. A61B 1/04
(52) U.S. Cl. ...................................... 600/109; 600/112
(58) Field of Search ................................ 600/101, 109, 600/127, 179, 407, 410, 423, 102, 118, 112, 130, 131, 167, 182, 424; 128/908, 920, 923, 903; 348/65, 69, 70, 318, 322; 606/130

(56) References Cited

U.S. PATENT DOCUMENTS

| 4,633,304 A | * | 12/1986 | Nagasaki | ..................... 348/69 |
| 5,259,365 A | * | 11/1993 | Nishikori et al. | ........... 600/102 |
| 5,331,949 A | * | 7/1994 | Funakoshi et al. | ........... 600/109 |
| 5,740,801 A | * | 4/1998 | Branson | ..................... 600/407 |
| 5,879,289 A | * | 3/1999 | Yarush et al. | ............... 600/179 |
| 6,141,037 A | * | 10/2000 | Upton et al. | ................... 348/65 |
| 6,445,943 B1 | * | 9/2002 | Ferre et al. | ................. 600/424 |

* cited by examiner

*Primary Examiner*—Tu Ba Hoang
(74) *Attorney, Agent, or Firm*—Greenblum & Bernstein, P.L.C.

(57) ABSTRACT

An endoscope system with an endoscope, a TV monitor, and a peripheral device separate from the endoscope and the TV monitor is provided. The endoscope includes an objective optical system and an image pickup device that converts an image formed by the objective optical system into a video signal which can be indicated in the TV monitor. The endoscope also includes a signal generator that generates a control signal to be supplied to the peripheral device so as to control the peripheral device. Additionally, the endoscope includes a transmitter that transmits the video signal to the TV monitor while no control signal is generated by the signal generator. The transmitter also transmits, as a radio signal, both the video signal and the control signal to the TV monitor and the peripheral device upon the control signal being generated by the signal generator. The endoscope also includes a signal adder that adds the control signal to a blanking interval of the video signal to output the video signal added with the control signal to the transmitter.

23 Claims, 5 Drawing Sheets

ENDOSCOPE SYSTEM AND VIDEO CAMERA FOR ENDOSCOPE

BACKGROUND OF THE INVENTION

1. Field of the Invention

The present invention relates to an endoscope system and a video camera for an endoscope, in which a picked-up image of an organism is transmitted to a receiver by radio control.

2. Description of the Related Art

Since in emergency medical treatment, or at the side of a patient's bed, an easy procedure is necessary, a portable cordless endoscope which is provided with a light source and a power source therefore, so that no mechanical connection to an external light source apparatus is necessary, has been used. An endoscope apparatus has been proposed in which a video camera is connected to an eyepiece portion of the cordless endoscope, so that an endoscopic image picked-up by the video camera can be used for diagnosis. In the endoscope apparatus, it is possible to provide a TV monitor in which the endoscopic image is indicated as in an electronic endoscope, a video printer which is adapted to print the endoscopic image, an image recorder in which the viewed endoscopic image is recorded on a recording medium, or a filing device in which the endoscopic image is filed with additional information such as information of a patient or date of diagnosis, etc., in accordance with need. However, since it is necessary to operate the peripheral devices, advantages such as the ease of operation of the cordless endoscope are sacrificed.

Moreover, in the endoscope apparatus mentioned above, to adjust, for example, the brightness or enhancement level of the video camera, it is necessary to confirm the brightness or enhancement level through an indication portion of the camera body after an operation switch provided on the camera body is operated. The indication portion makes the video camera large and heavy. Furthermore, in general, the user views the endoscopic image through the TV monitor, and hence it is considerably troublesome for the user to confirm the adjustment in the indication portion of the camera body.

It is an object of the present invention to provide an endoscope apparatus in which the endoscopic image can be recorded or printed, etc., by an easy operation. Another object of the present invention is to provide a small and light endoscope apparatus in which information (video settings) of an image pickup device of the endoscope is indicated and confirmed in a TV monitor.

SUMMARY OF THE INVENTION

In order to achieve the above-mentioned objects, an endoscope system including an endoscope, a TV monitor, and a peripheral device separate from the endoscope and the TV monitor is provided, the endoscope including an objective optical system; an image pickup device for converting an image formed by the objective optical system into a video signal which can be indicated in the TV monitor; a signal generator for generating a control signal to be supplied to said peripheral device so as to control the peripheral device; and a transmitter for transmitting the video signal to the TV monitor while no control signal is generated by the signal generator, and for transmitting both the video signal and the control signal to the TV monitor and the peripheral device upon the control signal being generated by the signal generator, as a radio signal, by radio control.

Preferably, the video signal and the control signal is transmitted by radio control on one channel.

Preferably, the endoscope further comprises a signal adder for adding the control signal to the video signal to output the video signal added with the control signal to the transmitter.

In an embodiment, the video signal is a TV signal, and the signal adder adds the control signal to a blanking interval of said TV signal so that said blanking interval includes the control signal.

In an embodiment, the signal generator includes an operation member for controlling the peripheral device so that the signal generator generates the control signal in accordance with operation of the operation member.

In an embodiment, the peripheral device is a video printer which prints the image picked-up by the image pickup device In an embodiment, the peripheral device is an image recorder which records the image picked-up by the image pickup device.

The endoscope can be applied to, for example, a fiberscope, a rigid endoscope, an electronic endoscope, or an endoscope having an optical fiber through which the image formed by the objective optical system is transmitted, so that the image transmitted through the optical fiber can be picked up by the image pickup device.

According to another aspect of the present invention, an endoscope system including an endoscope, a TV monitor, and a peripheral device separate from the endoscope and the TV monitor is provided, the endoscope including an objective optical system; an image pickup device for producing a video signal, which can be indicated in the TV monitor, from an image formed by the objective optical system; a signal generator which generates an information signal for indicating a setting state of said image pickup device in said TV monitor.

Preferably, the endoscope further comprises a transmitter for transmitting the video signal and the information signal, which constitutes a radio signal, to the TV monitor by radio control, so that both the image picked-up by said image pickup device and the setting state of the image pickup device can be indicated in the TV monitor.

In an embodiment, the signal generator includes an operation member for changing the setting state of the image pickup device so that the signal generator generates the information signal in accordance with operation of the operation member.

Preferably, the information signal includes a character signal, so that the setting state of the image pickup device can be indicated by characters in the TV monitor.

Preferably, the endoscope further comprises a signal adder for adding the information signal to the video signal to output the video signal added with the information signal to the transmitter.

In an embodiment, the video signal is a TV signal, and the signal adder adds the information signal to a displayed period of the TV signal.

In an embodiment, an image masking device is further provided, for adding a image masking signal to the video signal in order to mask the periphery of the image picked-up by the image pickup device, and wherein said signal adder adds the information signal to the image masking signal, and wherein said transmitter transmits the video signal added with the masking signal which includes the information signal, by radio control.

According to another aspect of the present invention, a video camera for an endoscope which is provided with a TV monitor and a peripheral device separate from the endoscope and the TV monitor is provided, the video camera including an image pickup device which converts an image formed by the endoscope into a video signal which can be indicated in said TV monitor; a signal generator for generating a control signal to be supplied to said peripheral device so as to control the peripheral device; and a transmitter for transmitting the video signal to the TV monitor while no control signal is generated by said signal generator, and for transmitting both the video signal and the control signal to the TV monitor and the peripheral device upon the control signal being generated by said signal generator, as a radio signal, by radio control.

Preferably, the endoscope further comprises a signal adder for adding the control signal to the video signal to output the video signal added with said control signal to the transmitter.

In an embodiment, the signal generator includes an operation member for controlling the peripheral device so that the signal generator generates the control signal in accordance with operation of the operation member.

In an embodiment, the video signal is a TV signal, and the signal adder adds the control signal to a blanking interval of said TV signal so that said blanking interval includes the control signal.

In an embodiment, the peripheral device is a video printer which prints the image picked-up by the image pickup device.

In an embodiment, the peripheral device is an image recorder which records the image picked-up by the image pickup device.

According to another aspect of the present invention, a video camera for an endoscope which is provided with a TV monitor and a peripheral device separate from the endoscope and the TV monitor is provided, the video camera including an image pickup device which produces a video signal, which can be indicated in said TV monitor, from an image formed by the endoscope; a signal generator which generates an information signal for indicating a setting state of said video camera.

Preferably, the video camera further comprises a transmitter for transmitting the video signal and the information signal, which constitutes a radio signal, to the TV monitor by radio control, so that both the image picked-up by the image pickup device and the setting state of the image pickup device can be indicated in the TV monitor.

In an embodiment, the signal generator includes an operation member for changing the setting state of the video camera so that the signal generator generates the information signal in accordance with operation of the operation member.

Preferably, the information signal includes a character signal, so that the setting state of the image pickup device can be indicated by characters in the TV monitor.

Preferably, the endoscope further comprises a signal adder for adding the information signal to the video signal to output the video signal added with the information signal to the transmitter.

In an embodiment, the video signal is a TV signal, and the signal adder adds the information signal to a displayed period of said TV signal.

In an embodiment, an image masking device is further provided, for adding a image masking signal to the video signal in order to mask the periphery of the image picked-up by the image pickup device, and wherein said signal adder adds the information signal to the image masking signal, and wherein said transmitter transmits the video signal added with the masking signal which includes the information signal, by radio control.

The present disclosure relates to subject matter contained in Japanese Patent Applications Nos. 2000-42517 (filed on Feb. 21, 2000), 2000-43768 (filed on Feb. 22, 2000) and 2000-113712 (filed on Apr. 14, 2000) which are expressly incorporated herein by reference in their entireties.

BRIEF DESCRIPTION OF THE DRAWINGS

The invention will be discussed below with reference to the accompanying drawings, in which.

DESCRIPTION OF THE PREFERRED EMBODIMENT

Figure 1:
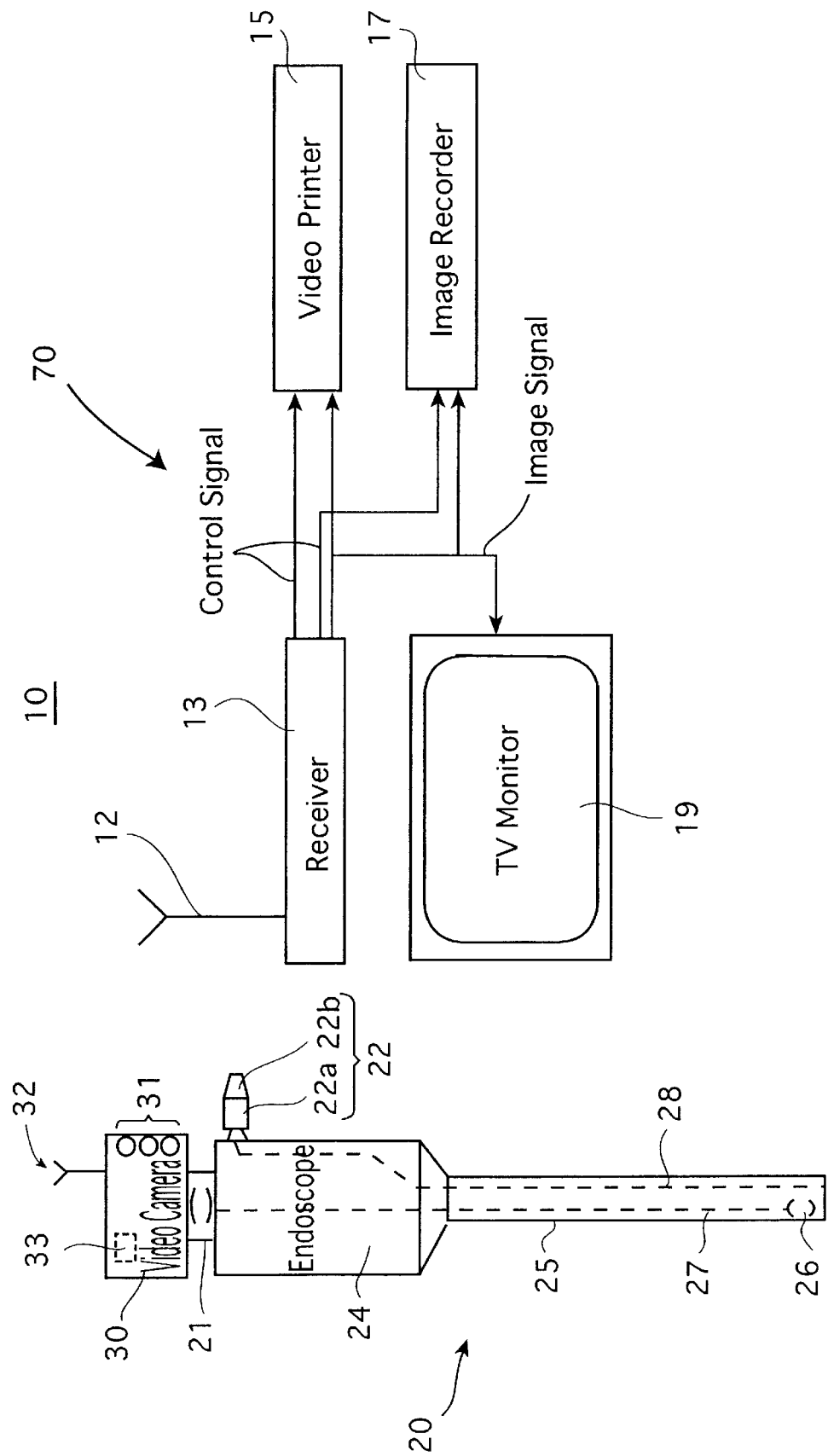
FIG. 1 is a schematic view of an endoscope system according to the present invention.

An endoscope system 10 to which an embodiment of the present invention is applied includes an endoscope 20 and peripheral devices 70. The peripheral devices 70 include a video camera 30, a receiver 13, a video printer 15, an image recorder 17, and a TV monitor 19. The endoscopic image picked-up by the video camera 30 through the endoscope 20 is transmitted by radio control to the receiver 13 via a transmitter antenna 32 and a receiver antenna 12. The endoscopic image received by the receiver 13 can be used in the video printer 15, the image recorder 17, and the TV monitor 19. Note that if the state of the image of the video camera 30 is adjusted, the setting state of the video camera 30 is indicated together with the endoscopic image in the TV monitor 19.

The endoscope 20 is a cordless portable fiberscope having an operating portion 24 and a flexible tube 25. The endoscope 20 is provided with a detachable light source unit 22 on the operating portion 24. The light source unit 22 is provided with a light source 22a and a battery 22b for the light source 22a. Light emitted from the light source 22a is emitted from the distal end of the flexible tube 25 via a light guide 28 to illuminate an object. An image of the illuminated object is formed on an objective optical system 26 provided at the distal end of the flexible tube 25, so that the image can be viewed by an eyepiece portion 21 via an image guide (optical fiber) 27.

It is possible to connect the video camera 30 to the eyepiece portion 21 of the endoscope 20. The video camera 30 is provided with a battery 33 incorporated therein, so that the video camera 30 can be used without needing a connection cord. The video camera 30 is provided on its outer housing with a switch group 31 having a plurality of switches, and a transmitter antenna 32 which sends the endoscopic image to the receiver 13 by radio.

Figure 2:
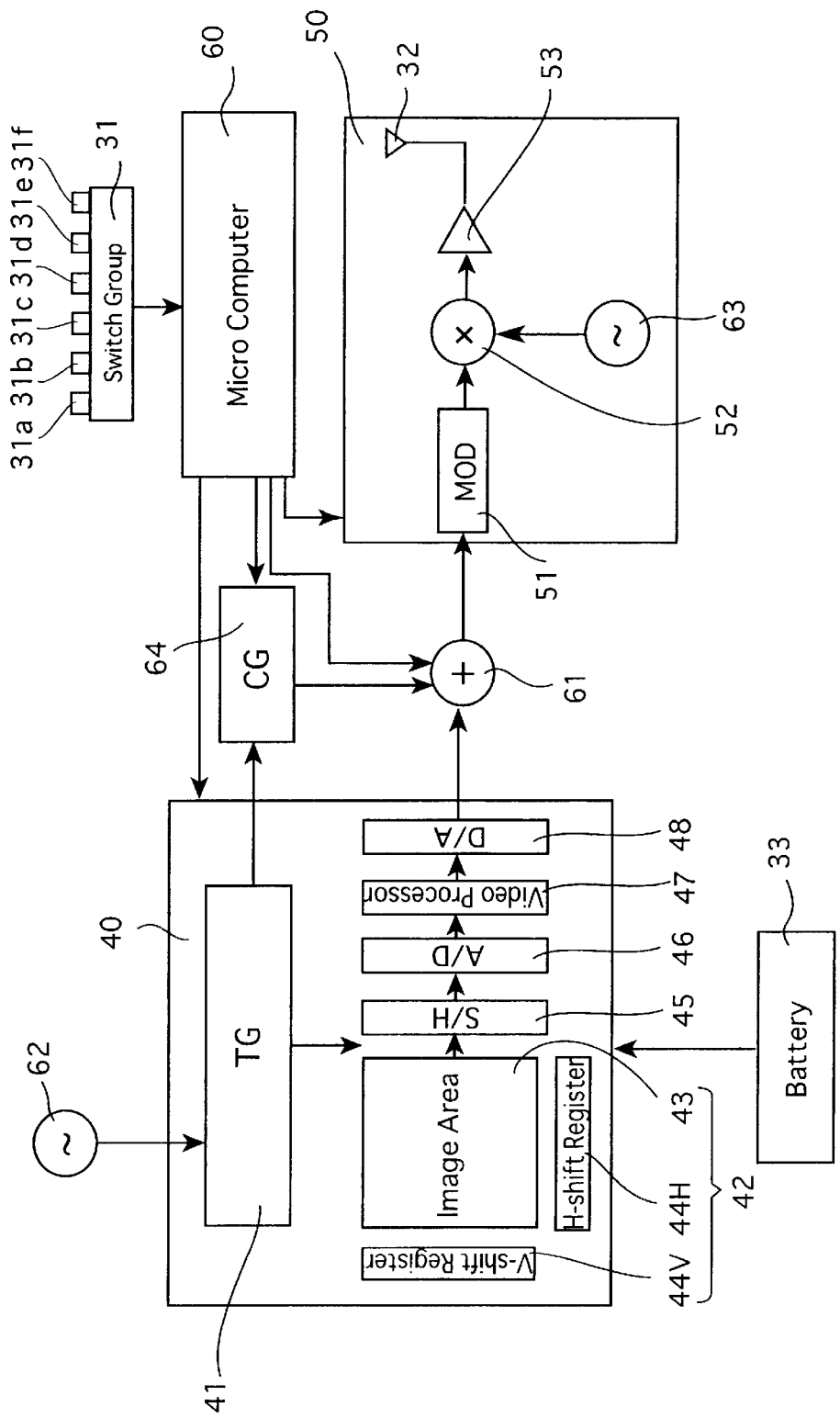
FIG. 2 is a block diagram of a control system of a video camera for an endoscope system shown in FIG. 1.

The control system of the video camera 30 will be discussed below with reference to FIG. 2. The control system includes an image pickup portion (image pickup device) 40, a modulator/transmitter 50, a microcomputer 60, an adder (signal adder) 61, a character generator (image masking device) 64, and the switch group (operation member) 31. The control system has a function to convert an endoscopic image into a video signal, a function to generate a control signal to control the peripheral devices 70 and a information signal to indicate the setting state of video camera 30 in TV monitor 19, and a function to transmit the video signal, the control signal, and the information signal by radio control. The microcomputer 60 combined with and the switch group 31 constitutes a control signal generator which generates the control signal. The microcomputer 60 combined with the character generator 64 constitute a signal generator which generates the information signal.

The image pickup portion 40 is provided with a timing generator (TG) 41, an image sensor 42, a sample and hold circuit (S/H) 45, an A/D converter 46, a video processor 47, and a D/A converter 48.

The timing generator 41 generates a drive signal (scan reading signal) to drive the image sensor 42 and a synchronization signal, etc., based on clock signals output from a first oscillator 62.

The image sensor 42 is a MOS (metal oxide semiconductor) scanning image sensor which is provided with an image area 43, and horizontal and vertical shift registers 44H and 44V. The image area 43 converts the received light into an electric charge, wherein the charge is accumulated for each cell. The horizontal and vertical shift registers 44H and 44V scan the cells of the image area 43 and sequentially read the accumulated charges in accordance with the synchronization signal supplied from the timing generator 41. The accumulated charges thus read are converted by the S/H circuit 45 to a voltage signal for each cell, which is then subject to an A/D conversion by the A/D converter 46. The digital signal is converted to a digital video signal by the video processor 47 and is converted to an analogue video signal by the D/A converter 48, and is sent to the adder 61.

The modulator/transmitter 50 includes a second oscillator 63 which generates a carrier wave, a modulator (MOD) 51 which modulates the signal input thereto from the adder 61, a multiplier 52 which multiplies the signal modulated by the modulator 51 by the carrier wave, a transmission amplifier 53 which amplifies the carrier wave which carries the modulated signal, and a transmitter antenna 32. The carrier wave amplified by the transmission amplifier 53 is sent from the transmitter antenna 32 to the receiver antenna 12 of the receiver 13 (FIG. 1) by radio control. In the illustrated embodiment, frequencies for TV broadcasting channels are used as transmission frequencies. The transmission frequencies can be switched and set by a frequency selection switch 31$f$ provided in the switch group 31.

The switch group 31 is provided with a plurality of switches, including a video printer switch 31$a$ which is adapted to instruct the video printer 15 to carry out the print operation, a image recorder switch 31$b$ which is adapted to instruct the image recorder 17 to start or stop a recording operation, a brightness switch 31$c$ which is adapted to adjust the brightness of the image, a RGB switch 31$d$ which is adapted to correct the RGB output levels, an image rotation switch 31$e$ which is adapted to change the scan direction of the image sensor 42 to rotate the image at an angular pitch of 90 degrees in the clockwise or counter clockwise direction, and the frequency selection switch 31$f$. When a switch (31$a$ through 31$f$) of the switch group 31 is depressed, the signal corresponding to the depressed switch is sent to the microcomputer 60.

If the video printer switch 31$a$ or the image recorder switch 31$b$ is depressed, the microcomputer 60 outputs a control signal corresponding the depressed switch to the adder 61, in accordance with the synchronization signal output from the timing generator 41. The control signal is added to the video signal output from the image pickup portion 40 by the adder 61 and is output to the modulator/transmitter 50. In the illustrated embodiment, the video signal output from the image pickup portion 40 is a TV signal, and the microcomputer 60 controls the output timing so that the output control signal is carried on the video signal (between the period for the vertical synchronization and the period for the image).

If either the brightness switch 31$c$, the color correction switch 31$d$, or the image rotation switch 31$e$ is depressed, the microcomputer 60 controls the image pickup portion 40 to adjust the video setting (image state) corresponding the depressed switch and outputs the changed video setting data to the character generator (CG) 64. In other words, the brightness switch 31$c$, the color correction switch 31$d$ and the image rotation switch 31$e$ are video setting switches.

If the frequency selection switch (frequency setting switch) 31$f$ is depressed, the microcomputer 60 controls the modulator/transmitter 50 to adjust the transmission frequency and outputs the changed transmission frequency data to the character generator 64.

Figure 3:
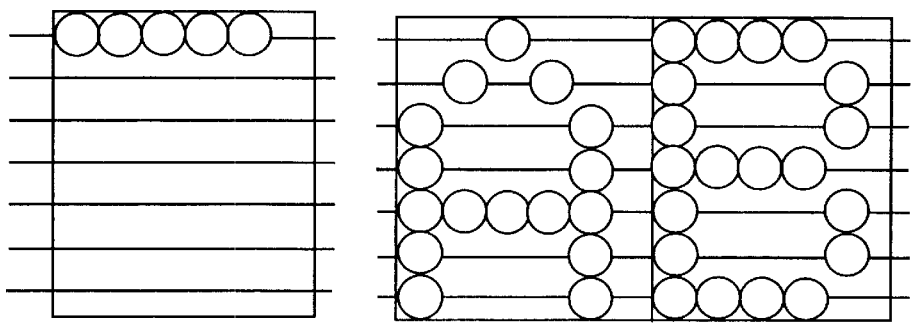
FIG. 3 shows an example of a character pattern produced by a character generator.
Figure 5C:
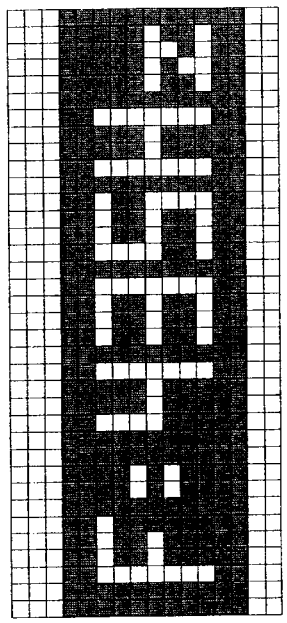
FIG. 5C is a schematic view of an information indicated in the picture mask portion, by way of example.
Figure 5A:
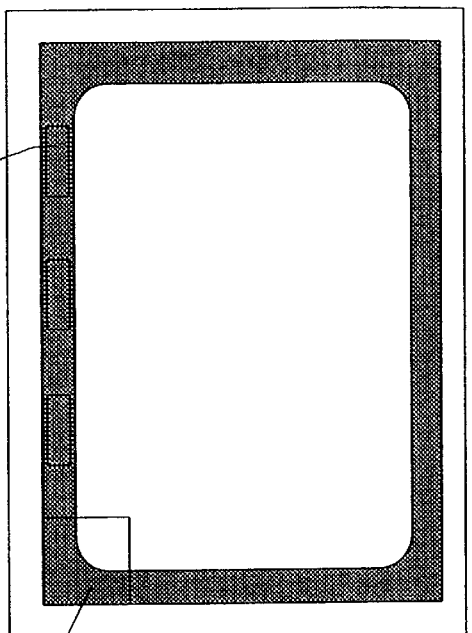
FIG. 5A is a schematic view of a screen of a TV monitor on which a character pattern is indicated.

The character generator (image masking device) 64 constantly generates the image masking signal which masks the periphery of the endoscopic image picked-up (i.e., converted into a video signal) by the image pickup portion 40. When all of the switches 31$c$ through 31$f$ are OFF, only the image masking signal is generated, so that a character pattern shown in FIG. 5A is displayed. When any one of the switches 31$c$ through 31$f$ are turned ON, the changed video setting/transmission frequency data is supplied from the microcomputer 60, and the character generator 64 generates an information signal corresponding to the changed video setting/transmission frequency data together with the image masking signal. The information signal is composed of a character signal (character pattern) which represents the video setting/transmission frequency data which is changed by the switches 31$c$ through 31$f$. In the illustrated embodiment, as can be seen in FIG. 3, the character pattern is generated for each horizontal scanning line, so that a line of figures/letters is formed by 7 horizontal scanning lines. The image masking signal and the information signal, generated by the character generator 64 are output in accordance with the synchronization signal from the timing generator 41 and are added to the video signal by the adder 61 and supplied to the modulator/transmitter 50.

Figure 4:
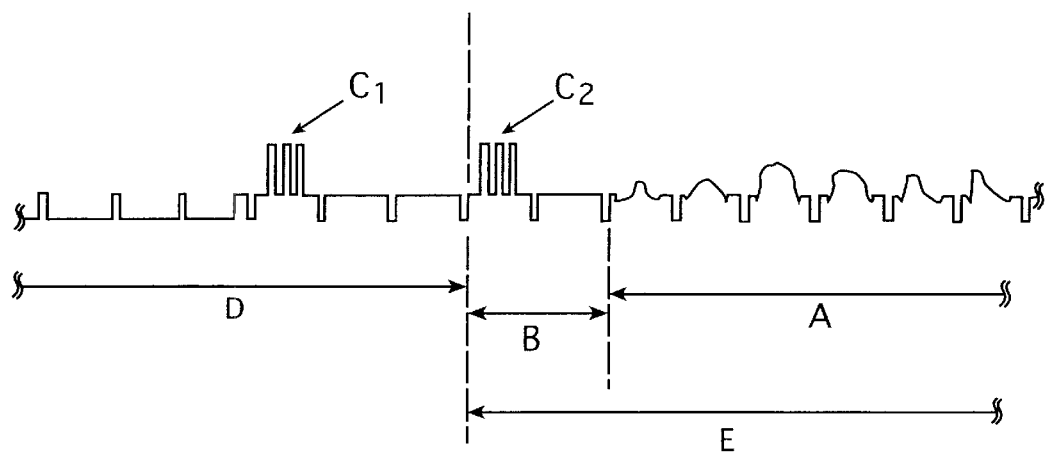
FIG. 4 shows an example of signals output from an adder to modulator/transmitter.

An example of the signal which is supplied from the adder 61 to the modulator/transmitter 50 when the switch group 31 is depressed is shown in FIG. 4. In FIG. 4, 'A' represents the period of the video signal output from the image pickup portion 40, 'B' represents the period of the image masking signal, 'C1' represents the period of the control signal, 'C2' represents the period of the information signal, and 'D' represents the period of the vertical interval reference signal.

'E' represents the period can be displayed in TV monitor 19 (total period of 'A' and 'C2'). According to the above explanations on the period "C", the information signal is described as the seven horizontal scanning lines; however, for clarity, only one horizontal scanning line is shown in FIG. 4. Also, in FIG. 4, the image masking signal for only two horizontal scanning lines is shown for clarity.

The transmission signal (radio signal) is transmitted from the transmitter antenna 32 by radio control, and is received by the receiver 13 via the receiver antenna 12. Thus, in this embodiment, the video signal and the control signal, or the video signal and the information signal are transmitted or received by radio control on one channel.

Figure 5B:
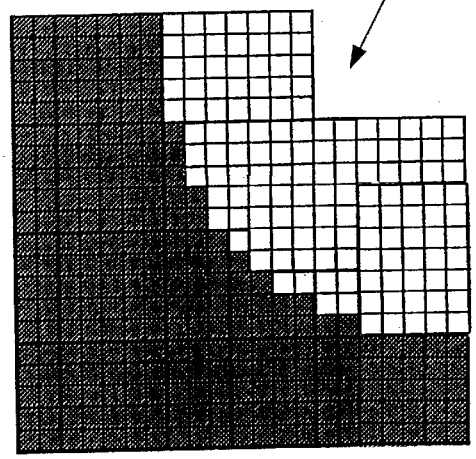
FIG. 5B is an enlarged partial schematic view of a picture mask portion.

The receiver 13 transmits the received video signal to the video printer 15, the image recorder 17 and the TV monitor 19, so that the endoscopic image displayed in the TV monitor 19 can be viewed. Since the image masking signal is added to the video signal, an image mask portion is formed around the endoscopic image picked-up by the video camera 30 (FIGS. 5A and 5B). If the switches 31*c* through 31*f* are depressed to change the video setting/transmission frequency, the modified video setting/transmission frequency information is indicated in the image mask portion on the TV monitor 19 since the information signal is added to the image masking signal (FIG. 5C). Note that FIG. 5C shows transmission frequency information indicated when the transmission frequency F is changed, for example, to 435 Hz.

The receiver 13 outputs the received control signal to a peripheral device corresponding the received control signal. Namely, if the control signal corresponding to the printer switch 31*a* is received, the control signal is transmitted to the video printer 15, so that the printing operation of the image displayed in the TV monitor 19 begins. If the control signal corresponding to the record switch 31*b* is received, the control signal is transmitted to the image recorder 17, so that the recording operation of the image data begins or stops.

The user operates the endoscope system 10 constructed as above, while observing an object portion to be examined through the TV monitor 19. During observation, if the user depresses the switch 31*a* or 31*b* at a desired time, the printing or recording of the image displayed in the TV monitor 19 can be carried out, respectively; if the user depresses one of the switches 31*c* through 31*e* at a desired time during observation, the image can be adjusted; and if the user depresses the switch 31*f*, the transmission frequency can be adjusted. Accordingly, since when the setting state of the video camera 30 is adjusted, by the operation of the switches 31*c* through 31*f*, the changed setting state of the video camera 30 is indicated in the TV monitor 19, and hence the operation can be easily confirmed by the user. Moreover, since the switch group 31 is provided on the video camera 30, the user can easily adjust the image state or operate the peripheral devices, while operating the endoscope 20, i.e., bending the flexible tube.

Figure 6:
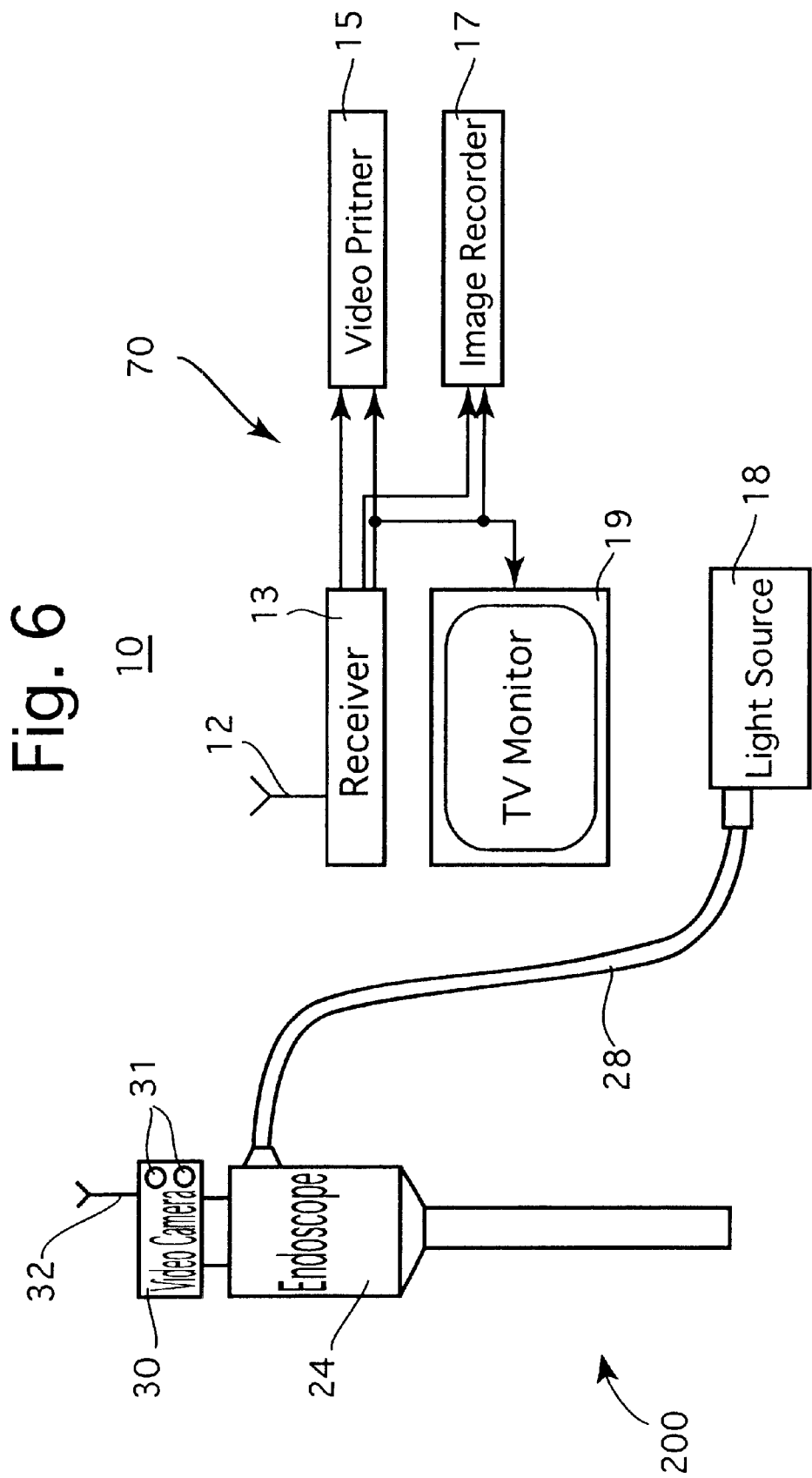
FIG. 6 is a schematic view of a second embodiment of an endoscope system according to the present invention.

FIG. 6 shows a second embodiment of the present invention. In the second embodiment, the switch group 31 to operate the peripheral devices 70 is provided on the video camera 30, so that the video signal and the control signal or the information signal are transmitted by radio control from a semi-portable endoscope 200 to the receiver 13. However, the endoscope 200 in the second embodiment is not as portable as the endoscope in the first embodiment in which the light source unit is attached. Namely, the light source 18 which is supplied with electricity from an external power source is connected through the light guide 28, in the second embodiment, and hence there is no chance of the light source 18 failing due to consumption of the battery.

Although the switch group 31 includes six switches in the above-mentioned embodiments, it is possible to provide additional switches such as a power ON/OFF switch for the peripheral devices, an adjustment switch for the TV monitor 19, and a shutter speed control switch for the video printer 15, etc. Moreover, it is possible to carry out various adjustments by three switches including an entering switch to determine the commencement of the adjustment operation and input operation, and up and down switches to increase or decrease the number of adjustment parameters or modify items of adjustment.

Although, in the illustrated embodiments, the adjustment of the image and indication of the TV monitor 19 are carried out each time the switches 31*c* through 31*f* are operated, the present invention is not limited thereto. For example, in an alternative structure, if one of the switches 31*c* through 31*f* is depressed a first time, the current setting state of the video camera 30 is indicated on the TV monitor 19, and thereafter, every time the switch depressed is depressed again within a predetermined period of time from the last depression, the setting state to be changed is indicated in the TV monitor 19. If a predetermined time has lapsed without depressing the depressed switch again, a setting state (image state) of the video camera 30 is changed as the information indicated in the TV monitor 19, wherein the information on the TV monitor 19 disappears. In other words, the setting state of the video camera 30 is changed, if the user just depresses one of the switch group 31 until desired information is indicated in the TV monitor 19.

The indication of the setting information of the video camera 30 is not limited to characters, but can alternatively be composed of figures, patterns or graphs, etc., or can be achieved by changing the indication color. Furthermore, the indication position of the setting state of the video camera 30 can be optionally set. For instance, it is possible to indicate the setting state of the video camera 30 so as to overlap the endoscopic image or to indicate the setting state of the video camera 30 only, without indicating the endoscopic image. If the setting state of the video camera 30 is indicated in the image mask portion, as in the illustrated embodiments, the setting state of the video camera 30 can be visually and easily recognized.

Since the portable endoscope 20/semi-portable endoscope 200 is used in the illustrated embodiments, the switch group 31 is provided on the video camera 30. However, it is possible to provide the switch group 31 at any other location, for example, on the operating portion 24 to ensure an easy operation, so long as the switch group 31 is provided in the vicinity of the operating portion 24. Also, although the endoscope system 10 is applied to a fiberscope in the illustrated embodiments, the present invention can be applied to an electronic endoscope. In electronic endoscope, the switch group 31, and the transmitter such as the modulator/transmitter 50 and the micro computer 60 can be provided integrally with the operating portion 24 or can be assembled as a unit. Moreover, the invention can be applied not only to an endoscope having a flexible tube but also to a rigid endoscope.

According to the present invention, since the switches for operating to the peripheral devices are provided on the endoscope, it is possible for the user to operate easily the peripheral devices while viewing the endoscopic image. Furthermore, according to the present invention, since the video settings of the video camera (image pickup device) is indicated in the TV monitor, it is possible for the user to carry out the image adjustment of the video camera, while viewing the endoscopic image. Moreover, according to the present invention, since the control signal to control the peripheral devices or the information signal to indicate the setting state of the video camera are transmitted by radio control, a small and light endoscope having a high operating efficiency and having no connection cord extending from the endoscope can be provided.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An endoscope system including an endoscope, a TV monitor, and a peripheral device separate from the endoscope and the TV monitor, said endoscope comprising:
    an objective optical system;
    an image pickup device that converts an image formed by the objective optical system into a TV signal which can be indicated in said TV monitor;
    a signal generator that generates a control signal to be supplied to said peripheral device so as to control the peripheral device;
    a transmitter that transmits, as a radio signal, the TV signal to the TV monitor when no control signal is generated by said signal generator, and that transmits, as a radio signal, both the TV signal and the control signal to the TV monitor and to the peripheral device upon the control signal being generated by said signal generator; and
    a signal adder that adds the control signal to a blanking interval of said TV signal to output the TV signal added with said control signal to the transmitter.

2. The endoscope system according to claim 1, wherein the TV signal and the control signal are transmitted as a radio signal on one channel.

3. The endoscope system according to claim 1, wherein said signal generator includes an operation member for controlling said peripheral device so that said signal generator generates said control signal in accordance with operation of the operation member.

4. The endoscope system according to claim 1, wherein said peripheral device comprises a video printer which prints the image picked-up by said image pickup device.

5. The endoscope system according to claim 1, wherein said peripheral device comprises an image recorder which records the image picked-up by said image pickup device.

6. The endoscope system according to claim 1, wherein said endoscope comprises a fiberscope endoscope having an eyepiece portion, and wherein said image pickup device is a video camera which is connectable to the eyepiece portion.

7. The endoscope system according to claim 1, wherein said endoscope comprises a rigid endoscope having an eyepiece portion, and wherein said image pickup device is a video camera which is connectable to the eyepiece portion.

8. The endoscope system according to claim 1, wherein said endoscope comprises an optical fiber through which the image formed by the objective optical system is transmitted, so that the image transmitted through the optical fiber can be picked up by the image pickup device.

9. The endoscope system according to claim 1, wherein said endoscope comprises an electronic endoscope.

10. An endoscope system including an endoscope, a TV monitor, and a peripheral device separate from the endoscope and the TV monitor, said endoscope comprising:
    an objective optical system;
    an image pickup device that produces a video signal, which can be indicated in said TV monitor, from an image formed by the objective optical system;
    a signal generator which generates an information signal that indicates a setting state of said image pickup device in said TV monitor;
    an image masking device that generates an image masking signal to mask the periphery of the image picked-up by the image pickup device
    a signal adder that adds the information signal to the image masking signal and that adds the information signal and the image masking signal to the video signal to output the video signal added with said information signal to the transmitter; and
    wherein the video signal added with the image masking signal which includes the information signal, is transmitted as a radio signal.

11. The endoscope system according to claim 10, wherein the endoscope further comprises a transmitter that transmits the video signal and the information signal so that both the image picked-up by said image pickup device and the setting state of the image pickup device can be indicated in the TV monitor.

12. The endoscope system according to claim 10, wherein said signal generator includes an operation member that changes the setting state of the image pickup device so that said signal generator generates said information signal in accordance with operation of the operation member.

13. The endoscope system according to claim 10, wherein said information signal comprises a character signal, so that the setting state of the image pickup device can be indicated by characters in the TV monitor.

14. The endoscope system according to claim 10, wherein the video signal is a TV signal, and wherein said signal adder adds the information signal to a displayed period of said TV signal.

15. A video camera for an endoscope which is provided with a TV monitor and a peripheral device separate from the endoscope and the TV monitor, said video camera comprising:
    an image pickup device which converts an image formed by an endoscope into a TV signal which can be indicated in a TV monitor;
    a signal generator that generates a control signal to be supplied to a peripheral device so as to control the peripheral device;
    a transmitter that transmits, as a radio signal, the TV signal to the TV monitor when no control signal is generated by said signal generator, and that transmits, as a radio signal, both the TV signal and the control signal to the TV monitor and to the peripheral device upon the control signal being generated by said signal generator; and
    a signal adder that adds said control signal to a blanking interval of said TV signal and that outputs the TV signal added with said control signal to said transmitter.
    wherein said signal adder adds said control signal to the blanking interval of said TV signal so as not to overlap the TV signal.

16. The video camera for an endoscope according to claim 15, wherein said signal generator includes an operation member that controls said peripheral device so that said signal generator generates said control signal in accordance with operation of the operation member.

17. The video camera for an endoscope according to claim 15, wherein said peripheral device comprises a video printer which prints the image converted by the image pickup device.

18. The video camera for an endoscope according to claim 15, wherein said peripheral device comprises an image recorder which records the image converted by the image pickup device.

19. A video camera for an endoscope which is provided with a TV monitor and a peripheral device separate from the endoscope and the TV monitor, said video camera comprising:

an image pickup device which produces a video signal, which can be indicated in a TV monitor, from an image formed by an endoscope;

a signal generator which generates an information signal that indicates a setting state of said video camera;

an image masking device that generates an image masking signal to mask the periphery of the image picked-up by the image pickup device, and a signal adder that adds the information signal to the image masking signal and that adds the image masking signal to the video signal to output the video signal and the information signal to a transmitter;

wherein the video signal added with the image masking signal which includes the information signal, is transmitted as a radio signal.

20. The video camera according to claim 19, wherein said video camera further comprises a transmitter that transmits the video signal and the information signal, which constitutes a radio signal, so that both the image picked-up by said image pickup device and the setting state of the image pickup device can be indicated in the TV monitor.

21. The video camera for an endoscope according to claim 19, wherein said signal generator includes an operation member that changes the setting state of said video camera so that said signal generator generates said information signal in accordance with operation of the operation member.

22. The video camera according to claim 19, wherein said information signal comprises a character signal, so that the setting state of the image pickup device can be indicated by characters in the TV monitor.

23. The endoscope system according to claim 19, wherein the video signal is a TV signal, and wherein said signal adder adds the information signal to a displayed period of said TV signal.

* * * * *